(12) United States Patent
Tamasi et al.

(10) Patent No.: US 9,489,541 B2
(45) Date of Patent: Nov. 8, 2016

(54) CONTENT PROTECTION VIA ONLINE SERVERS AND CODE EXECUTION IN A SECURE OPERATING SYSTEM

(75) Inventors: Anthony Michael Tamasi, Los Gatos, CA (US); Timothy Paul Lottes, Milpitas, CA (US); Bojan Skaljak, San Jose, CA (US); Fedor Fomichev, Sunnyvale, CA (US); Andrew Leighton Edelsten, Mountain View, CA (US); Jay Huang, Sunnyvale, CA (US); Ashutosh Gajanan Rege, San Francisco, CA (US); Keith Brian Galocy, Morgan Hill, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 80 days.

(21) Appl. No.: 13/458,891

(22) Filed: Apr. 27, 2012

(65) Prior Publication Data

US 2013/0067240 A1    Mar. 14, 2013

Related U.S. Application Data (60) Provisional application No. 61/533,060, filed on Sep. 9, 2011.

(51) Int. Cl.
| | |
|---|---|
| *G06F 21/74* | (2013.01) |
| *G06F 21/53* | (2013.01) |
| *G06F 21/10* | (2013.01) |

(52) U.S. Cl.
CPC ............... *G06F 21/74* (2013.01); *G06F 21/10* (2013.01); *G06F 21/53* (2013.01); *G06F 2221/0735* (2013.01); *G06F 2221/2105* (2013.01); *G06F 2221/2149* (2013.01)

(58) Field of Classification Search
CPC .................. G06F 21/10; G06F 21/74; G06F 2221/2149; G06F 21/53
USPC ........................................................ 713/189
See application file for complete search history.

(56) References Cited

U.S. PATENT DOCUMENTS

| | | | | |
|---|---|---|---|---|
| 6,986,052 | B1 * | 1/2006 | Mittal ................. | G06F 12/1441 711/E12.097 |
| 7,930,537 | B2 * | 4/2011 | Paatero .................... | G06F 21/10 380/278 |
| 8,468,600 | B1 * | 6/2013 | Kaskel .................... | G06F 21/53 726/22 |
| 8,499,304 | B2 * | 7/2013 | De Los Reyes ...... | G06F 3/0488 718/106 |
| 2004/0105298 | A1 * | 6/2004 | Symes .................. | G06F 9/4812 365/149 |
| 2004/0187117 | A1 * | 9/2004 | Orion .................... | G06F 9/4812 718/100 |
| 2005/0160210 | A1 * | 7/2005 | Watt ...................... | G06F 9/4812 710/269 |
| 2007/0294496 | A1 * | 12/2007 | Goss .................... | G06F 12/1408 711/163 |
| 2008/0127292 | A1 * | 5/2008 | Cooper .................. | G06F 21/53 726/1 |
| 2009/0172331 | A1 * | 7/2009 | Vembu .................... | G06F 21/10 711/163 |

(Continued)

FOREIGN PATENT DOCUMENTS

TW         201123808 A    7/2011

*Primary Examiner* — James Turchen (57) ABSTRACT

A computer system comprising a processor and a memory for storing instructions, that when executed by the processor performs a copy protection method. The copy protection method comprises executing a software loop of a first software application in a first operating system. A first call is executed in the software loop to a code portion. A decrypted code portion of the first software application is executed in a second operating system in response to the first call. The code portion is decrypted in response to a successful validation of the first software application.

17 Claims, 5 Drawing Sheets

(56) References Cited

U.S. PATENT DOCUMENTS

| | | | |
|---|---|---|---|
| 2009/0210709 A1* | 8/2009 | Fujiwara | H04N 21/2347 713/171 |
| 2010/0146292 A1 | 6/2010 | Shi | |
| 2010/0153667 A1* | 6/2010 | Andersson | G06F 21/123 711/162 |
| 2011/0154436 A1 | 6/2011 | Jian et al. | |
| 2011/0289294 A1* | 11/2011 | Maeda | G06F 21/74 711/163 |
| 2012/0260250 A1* | 10/2012 | Maeda | G06F 21/53 718/1 |
| 2013/0167222 A1* | 6/2013 | Lewis | G06F 21/53 726/17 |

* cited by examiner

CONTENT PROTECTION VIA ONLINE SERVERS AND CODE EXECUTION IN A SECURE OPERATING SYSTEM

CROSS-REFERENCES TO RELATED APPLICATIONS

This Application claims the benefit of U.S. Provisional Application No. 61/533,060, filed Sep. 9, 2011, entitled "DRM VIA ONLINE SERVERS & CODE EXECUTION IN A SECURE OS."

TECHNICAL FIELD

The present disclosure relates generally to the field of digital rights management and more specifically to the field of copy protection of software applications.

BACKGROUND

Digital rights management comprises a variety of methods, both hardware and software, utilized to control or limit the use of digital content. Such methods are typically used in an attempt to insure that all users of digital content have legitimately purchased the digital content. Such methods may also be used to control or limit software applications.

Software copy protection typically uses one or a combination of the following techniques: a full application can be provided after purchase or registration; a full software application can be activated using a serial number or key; or during installation or when the software is running, an online server can be queried to verify that the installation is legitimate or a registered copy. A problem with providing a full software application only after purchase or registration (either on a disk or via an Internet download) is that a legitimate purchaser can copy the software and provide it to another who could then install and run the software on another device. One problem with activating a full software application using a serial number or key is that a legitimate user can also give this serial number to another who can then activate another copy of the software with the same key. Lastly, a problem with querying an online server to verify whether the installation is legitimate or a registered copy (during installation or when the software is running) is that the program code that executes the online server check can be circumvented to always return a "legitimate" status.

With the advent of "always online" devices, the option of querying an online server has become a popular form of copyright protection. Unfortunately the online server checks can be easily removed or modified. For desktop and mobile device software this poses a serious problem as modified executables are executed by the operating system (OS) with no additional checks or notices. Piracy rates for desktop and mobile device software can be extremely high. For example, the piracy rates of software applications for mobile devices has been reported to be as high as 10:1 when comparing the number of individual software sales to the number of downloads of the software application. Therefore a demand exists for improved methods for controlling digital content and for providing copy protection for software applications.

SUMMARY OF THE INVENTION

Embodiments of the present invention provide a solution to the challenges inherent in managing copy protection in software applications. Embodiments of the invention improve copy management by providing a software application that is executed in a first operating system that includes a call to a function or procedure or routine, etc. that is executed in a secure operating system. A result returned in response to this call results in one of an inoperable state for the first software application if the first software application has not been validated and an operable state for the first software application if the first software application has been validated successfully. The result returned from the call that causes the inoperable state in the first software application comprises one of a predetermined response, garbage data, and returning no result.

According to one embodiment of the present invention, a method for copy management is disclosed. The method comprises executing a software loop of a first software application in a first operating system. A first function call in the software loop is also executed. A decrypted first function of the first software application in a second operating system is executed in response to the first function call, wherein the first function is decrypted in response to a successful validation of the first software application. If the first software application has not been validated then calling the first function will result in lockup or other program artifacts or failure. When the first software application has not been validated, then calling the first function call results in one of a predetermined response, garbage data, and returning no result.

According to one embodiment of the present invention, a computer system comprises a processor and a memory for storing instructions, that when executed by the processor performs a copy protection method. The copy protection method comprises executing a software loop of a first software application in a first operating system. A first function call is executed in the software loop. A decrypted first function of the first software application is executed in a second operating system in response to the first function call. The first function is decrypted in response to a successful validation of the first software application. If the first software application has not been validated then calling the first function will result in lockup or other program artifacts or failure. When the first software application has not been validated, then calling the first function call results in one of a predetermined response, garbage data, and returning no result.

According to one embodiment of the present invention, a computer system comprises a processor and a random access memory comprising an unsecured portion and a secured portion. The unsecured portion comprises a first operating system running a first software application. The first software application comprises a software loop. The secured portion comprises a second operating system running a second software application. The computer system further comprises a secured storage area storing a first function; and a memory for storing instructions, that when executed by the processor perform a copy protection method. The method comprises executing the software loop of the first software application and executing a first function call in the software loop. The first function of the first software application in the second operating system is executed in response to the first function call. A result of the first function call produces one of an inoperable state in the first software application when the first software application has not been successfully validated and an operable state in the first software application when the first software application has been successfully validated. If the first software application has not been validated then calling the first function will result in lockup or other program artifacts or failure. The result returned from the call that causes the inoperable state in the first software application comprises one of a predetermined response, garbage data, and returning no result.

BRIEF DESCRIPTION OF THE DRAWINGS

The present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Embodiments of the present invention provide a solution to the increasing challenges inherent in digital rights management and copy protection of software applications. Various embodiments of the present disclosure provide software application validation and copy protection by incorporating a portion (e.g., a "binary") of the software application to be executed in a secure operating system. As discussed in detail below, an exemplary software application is executed in a conventional, unsecure operating system, while a portion (the binary) of the software application is executed in and maintained in a secure operating system. In one exemplary embodiment, the software application executes a main program loop that comprises a call to a function which is to be executed in a secure operating system. The call to a function can be defined as a call to a subroutine, routine, procedure, or other functionality. As discussed in detail below, the exemplary function, etc. in the secure operating system can be decrypted only when the software application has been properly validated.

A result of issuing a function call for this binary produces one of an inoperable state for the software application if the software application has not been validated and an operable state for the software application if the software application has been validated successfully. The inoperable state renders the application unusable by returning garbage data. In one exemplary embodiment, if the software application has not been validated then calling the binary will result in lockup or other program artifacts or failure. In one exemplary embodiment, the result returned from the call that causes the inoperable state in the software application comprises one of a predetermined response, garbage data, and returning no result. As discussed in detail below, the decrypting of the secured function and the initialization and execution of the secured function are provided by a "secured service" application running in the secured operating environment.

Figure 1:
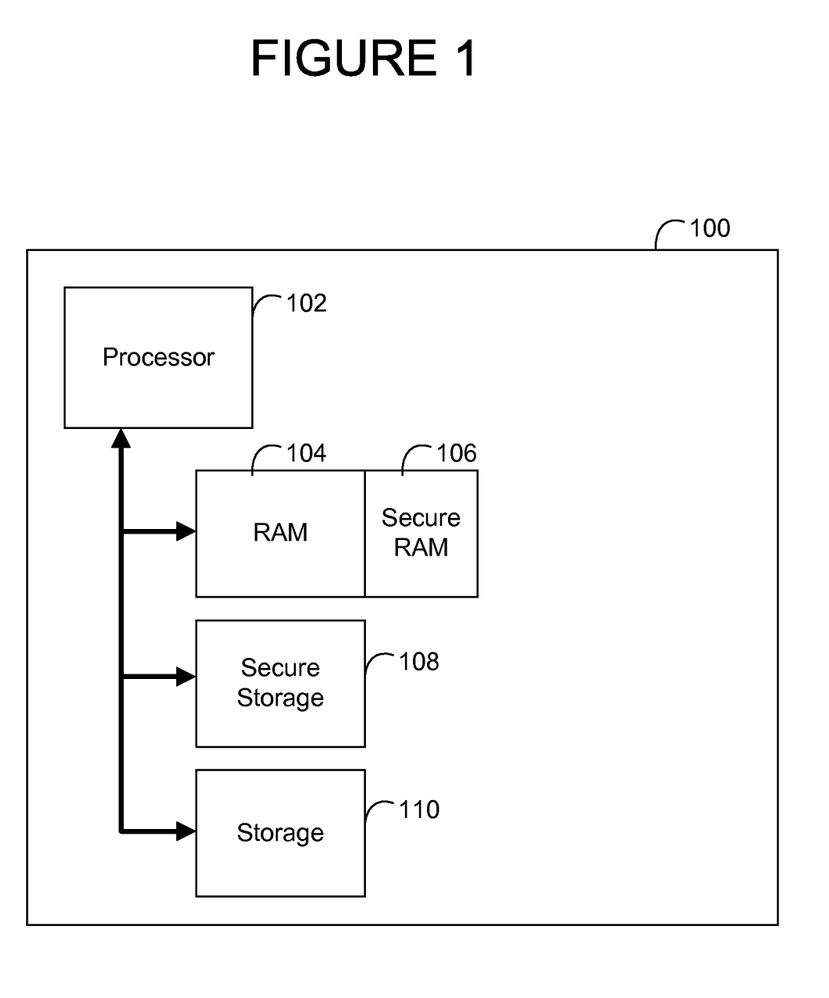
FIG. 1 illustrates an exemplary simplified block diagram of a computer system with a secured portion of random access memory and a secured storage area in accordance with an embodiment of the present invention.

FIG. 1 illustrates an exemplary computer system 100. The computer system 100 comprises a processor 102, a random access memory (RAM) module 104, a secure RAM module 106, a secure storage module 108, and a storage module 110 that is an unsecure storage module. In various embodiments, the computer system 100 can be a desktop computer, a laptop computer, a mobile computing device, a smart phone, a tablet computer, or some other computing device. In one exemplary embodiment, the processor 102 is a microprocessor. In one embodiment, the computer system comprises a system on chip (SOC). In one exemplary embodiment, the secure RAM 106 is a portion of the RAM 104. The portion of the RAM 104 that is to be secure RAM 106 can be selected. In one exemplary embodiment, a selectable bit for a memory address can assign the memory address as part of a secured zone. In one exemplary embodiment the secure storage 108 is part of a larger non-volatile memory device. In another exemplary embodiment, the secure storage 108 is a stand-alone non-volatile memory device.

As discussed in detail below, the computer system 100 of FIG. 1 can provide a conventional, unsecured, main operating environment (main OS) that utilizes the RAM 104 and the storage module 110, while also running a secured operating environment (Secure OS) that utilizes the Secure RAM 106 and the Secure Storage 108. In one embodiment, a Secure OS can comprise an encapsulated OS kernel running in a secure space within the main OS. In one exemplary embodiment, the Secure OS is a separate operating system separate from the main OS and runs on boot in the background. The Secure OS can utilize security features in the computer processor 102 to provide a secure boot for the base operating system and for processes and services running in the Secure OS, with an encrypted file system (Secure Storage 108), a Secure RAM 106, and a separate CPU processing. In one embodiment, as discussed in detail below, the secure OS can run applications that are executed inside the secure OS. In one embodiment, applications run in the Secure OS can be accessed by standard processes through specific API calls. Because such applications are accessible only inside the Secure OS, they can be provided with encrypted processing, storage, and RAM.

Figure 2:
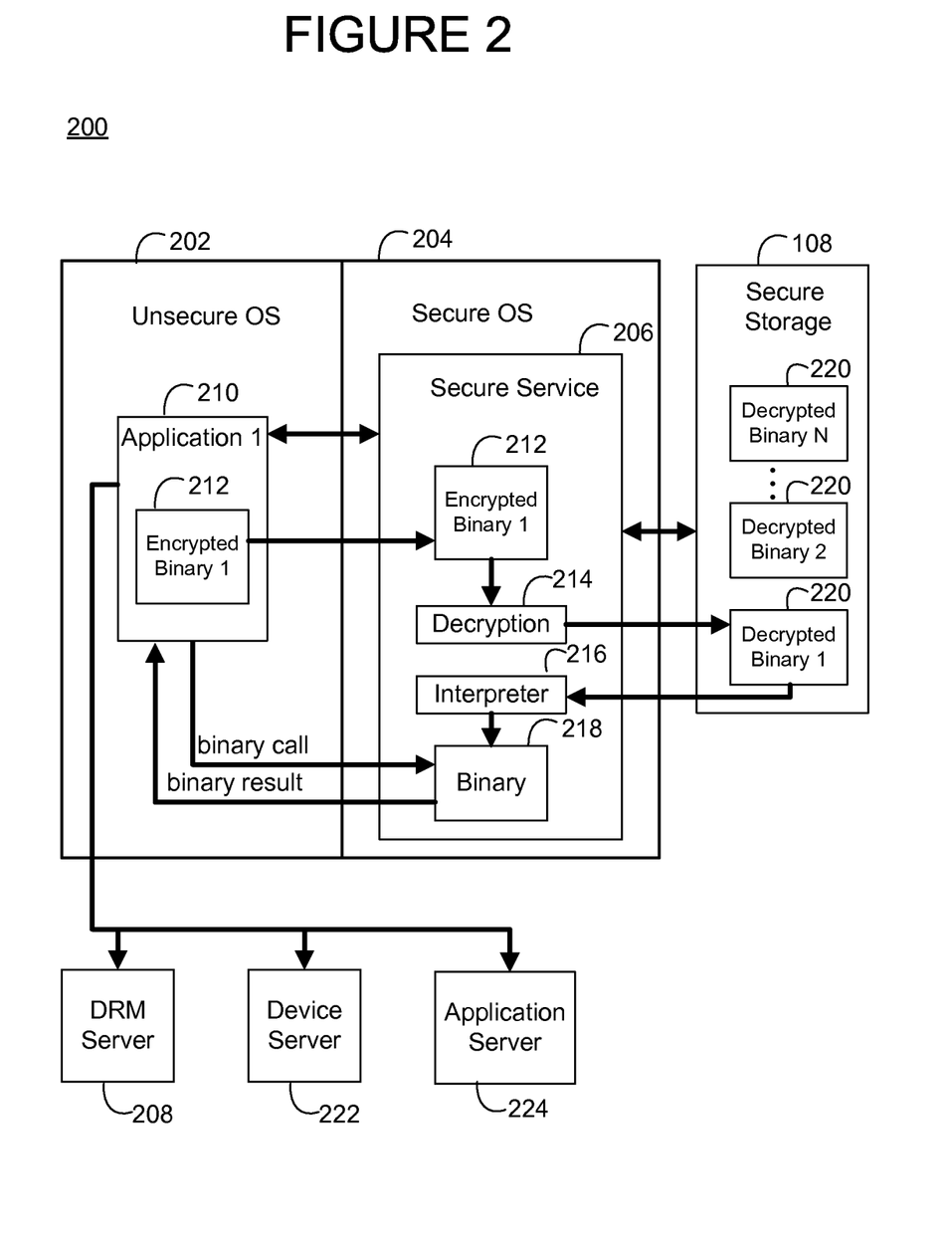
FIG. 2 illustrates an exemplary simplified block diagram of an operating system environment comprising a secured operating system portion implementing a digital rights management in accordance with an embodiment of the present invention.

FIG. 2 illustrates an exemplary computer operating system environment implementing a copy-protection technique. As illustrated in FIG. 2, an exemplary software operating environment 200 comprises a conventional main operating system (Unsecure OS) 202 and a secured operating environment (Secure OS) 204. The Secure OS 204 comprises a secure software application ("Secure Service") 206 which comprises an encrypted portion (e.g., the Binary) 212 of a software application 210, a decryption module 214 for decrypting the encrypted Binary 212, an Interpreter module 216 for interpreting, initializing, and preparing the decrypted Binary 212 for execution, and an initialized binary ("Binary") 218 ready for execution. In one exemplary embodiment, the Interpreter module 216 may be replaced with native CPU instructions. As discussed in detail below, an exemplary Interpreter module 216 or other similar module may provide interpretive services in accordance with secure OS restrictions.

In one exemplary embodiment, the Interpreter 216 interprets the code of the decrypted binary 212 so that it can be executed to perform its required functionality. As discussed below, because the Binary 218 can be any compiled function, the Secure Service 206 takes the compiled code of the decrypted Binary 220, decompiles it and creates the Binary 218 that is able to perform the required functionality of the encrypted Binary 212.

As also illustrated in FIG. 2, the Unsecure OS 202 comprises a software application 210, which can comprise an encrypted portion 212 that as illustrated in FIG. 2, can be passed to the Secure Service 206 in the Secure OS 204 for decrypting in the Decryption module 214. FIG. 2 also illustrates the Application 210 connecting to a DRM secure server 208, a device server 222, and an application server 224. In one exemplary embodiment, the encrypted Binary 212 is not retained in the software application 210 but is downloaded from the application server 224 during a validation phase described below, or after the validation phase as needed, and is passed through the software application 210 to the Secure Service 206 for decrypting 214.

As also illustrated in FIG. 2, and discussed below, once decrypted and interpreted/initialized by the Secure Service 206, the Binary 218 is ready for execution in response to its corresponding function call from the software application 210. As illustrated in FIG. 2, the Application 210 can call the Binary 218 and receive a Binary result. In one exemplary embodiment, in calling the binary 218, the Application 210 passes one or more variables to the Binary 218. The Binary 218 is executed with the variables provided and any results are returned to the Application 210. A Secure Storage 108 connected to the Secure OS 206, as illustrated in FIG. 2 can contain a plurality of decrypted portions or Binaries 220 of a plurality of corresponding applications. As discussed below, after verification of the Application 210, the encrypted Binary 212 can be decrypted 214 and the decrypted Binary 220 copied to the Secure Storage 108 for later retrieval. For example, the next time an Application 210 is opened, the decrypted Binary 220 (if available) can be loaded into the Secure Service 216 from the Secure Storage 108 and initialized/prepared by the Interpreter 216 to run as the Binary 218.

As discussed in detail below, the results of issuing a call to the Binary 218 can be dependent on whether or not the software application 210 has been properly validated or verified. As discussed above and below, only when the software application 210 has been validated will a decryption key be provided to the Decryption module 214 to decrypt the encryption portion 212. If the encrypted Binary 212 has not been decrypted, then calling the Binary 218 will result in the Binary 218 returning a response comprising "garbage" data such that the Application 210 will enter an inoperable or unusable state as determined by the results provided. In other words, rather than the desired Binary 218 executing with the passed variables, if the Application 210 has not been validated, unrecognized or garbage data can be returned in response to the Binary 218 call. In one exemplary embodiment, if the Application 210 has not been validated then calling the Binary 218 will result in lockup or other program artifacts or failure. In one exemplary embodiment, the result returned from the call that causes the inoperable state in the Application 210 comprises one of a predetermined response, garbage data, and returning no result. If the encrypted portion has been properly decrypted, then the desired Binary 218 will be available, and calling the Binary 218 will result in a proper result based upon the variables provided in the Binary call and the Application 210 will remain in an operable state.

Figure 3:
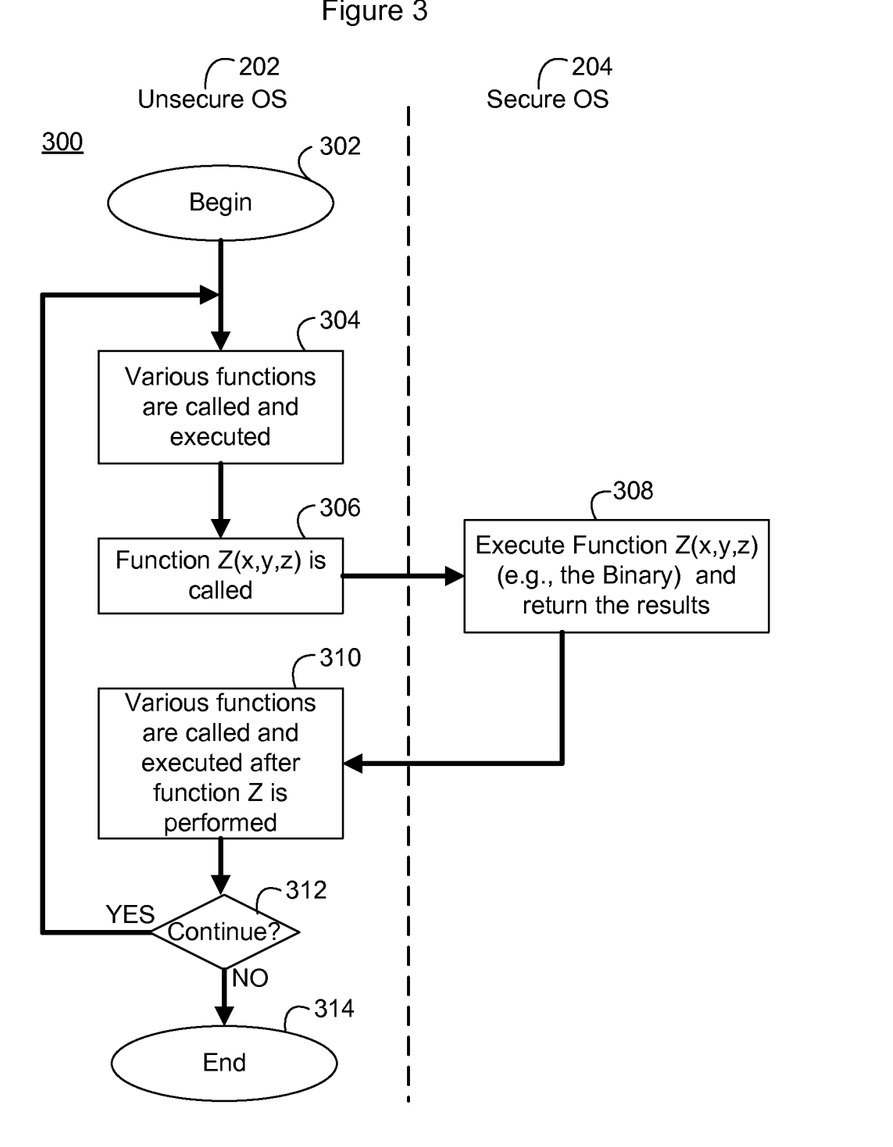
FIG. 3 illustrates an exemplary simplified block diagram of an operating system environment comprising an unsecured operating system and a secured operating system in accordance with an embodiment of the present invention.

FIG. 3 illustrates an exemplary flow diagram of a plurality of computer controlled steps executed in an exemplary main application execution loop utilizing an operating system environment comprising an Unsecure OS 202 and a Secure OS 204. In one exemplary embodiment, an Application 210 can comprise an execution loop that is always running Such an execution loop can have a beginning and an end. As illustrated in FIG. 3, somewhere in the execution loop can be a portion of code (e.g., a function (the Binary 218)) that must be called which executes in the Secure OS 204. In one exemplary embodiment, the remainder of the Application 210 will be dependent upon the results computed by the Binary 218.

As illustrated in FIG. 3, before the main application execution loop 300 begins in step 304, the Application 210 is opened in step 302. As discussed below, while the Application 210 is opening in step 302, the Binary can be prepared for execution in the Secure OS 204 by the Secure Service Application 206. In step 304 of FIG. 3, the exemplary main application execution loop 300 begins with the calling and execution of one or more functions in the Unsecure OS 202.

In step 306 of FIG. 3, the execution loop 300 executes a function call in the Unsecure OS 202 for a function Z that is located in the Secure OS 204. As illustrated in FIG. 2, the function call for function Z is to the Binary 218. As illustrated in FIG. 3, executing the function call for function Z in step 306 can comprise sending one or more variables to function Z (the Binary) 218 for execution. As discussed below, in one exemplary embodiment, the one or more variables can comprise an application ID for the software application 210, as well as one or more blocks of data for processing by the Binary 218.

In step 308 of FIG. 3, the Binary 218 having received the function call with the variables can execute the Binary function 218 and return the results to the Application 210. In step 310 of FIG. 3, having received the results of the Binary 218 execution, the main application execution loop 300 can use the Binary results and continue the execution loop 300. As illustrated in FIG. 3, in step 310, the execution loop 300 can continue with the calling and execution of one or more functions in the Unsecure OS 202. In one exemplary embodiment, the one or more functions in step 310 are different from the one or more functions in step 304. In one exemplary embodiment, the one or more functions in step 310 are the same as the one or more functions in step 304. In one exemplary embodiment, the one or more functions executed in step 310 make use of the results of the Binary execution. In step 312 of FIG. 3, the Application 210 determines whether or not to continue running the main application execution loop 300. If the execution loop 300 is to end, then the execution loop 300 proceeds to step 314 and ends. If the execution loop 300 is to continue, then the execution loop 300 returns to step 304.

As discussed in detail below, the results that are returned from running the Binary 218 can be dependent upon whether or not the Application 210 has been properly validated. As discussed herein, if the Application 210 has been validated then a properly decrypted Binary 212 can be interpreted/initialized by the Interpreter 216 such that the Binary 218 will be available when the function call to the Binary 218 is issued in step 306. However, if the Application 210 has not been properly validated then the encrypted Binary 212 will not have been decrypted. In one exemplary embodiment, when the encrypted Binary 212 has not been decrypted, then any call to the Binary 218 will return a result comprising unrecognized or garbage data. Such garbage data can be tailored by the manufacturer of the Application 210 to produce a desired inoperable state for the Application 210. In one exemplary embodiment, if the Application 210 has not been validated then calling the Binary 218 will result in lockup or other program artifacts or failure. In one exemplary embodiment, the result returned from the call that causes the inoperable state in the Application 210 comprises one of a predetermined response, garbage data, and returning no result.

In one exemplary embodiment, a portion of the Application 210 run as a Binary 218 by the Secure Service 206 in the Secure OS 204 can be a portion of a video game's artificial intelligence (AI). As discussed, the Binary 218 will only execute if a software application license validation process is successful. Therefore, if any calls to the Secure Service 206 were removed in an attempt to circumvent the license validation, the video game would run, but without the proper AI (receiving only the selected garbage data rather than a response from the Binary 218). Without AI, the game would be likely unplayable as the AI can form a key component of the gameplay.

In one exemplary embodiment, a portion of the Application 210 run as a Binary 218 by the Secure Service 206 in the Secure OS 204 can be a portion of a video game's collision detection code that is dependent upon the video game's licensing server checks. In one embodiment, if the calls to the Secure Service 206 (for the licensing server checks) were removed, an un-validated copy of the software application can execute, but characters within the video game may walk through walls and other objects in the game's virtual world, ruining the experience. Instead of the Binary 218 executing its collision detection code, predetermined garbage data would be returned in response to the Binary call.

In one exemplary embodiment, a portion of the Application 210 run as a Binary 218 by the Secure Service 206 in the Secure OS 204 can be a portion of a word processor's "generate available fonts" function. Therefore, if calls to the Secure Service 206 are removed in this implementation, the Application 210 could no longer generate the list of available fonts. Without fonts, the Application 210 would be unable to write or edit text, making such an un-validated word processing program useless.

Therefore, as described herein, by combining the Secure OS's 204 secure execution space, a Secure Service 206 that can execute code, and an online licensing server check to provide copy protection of software applications, software manufacturers can greatly reduce piracy of their video games and applications.

Figure 4:
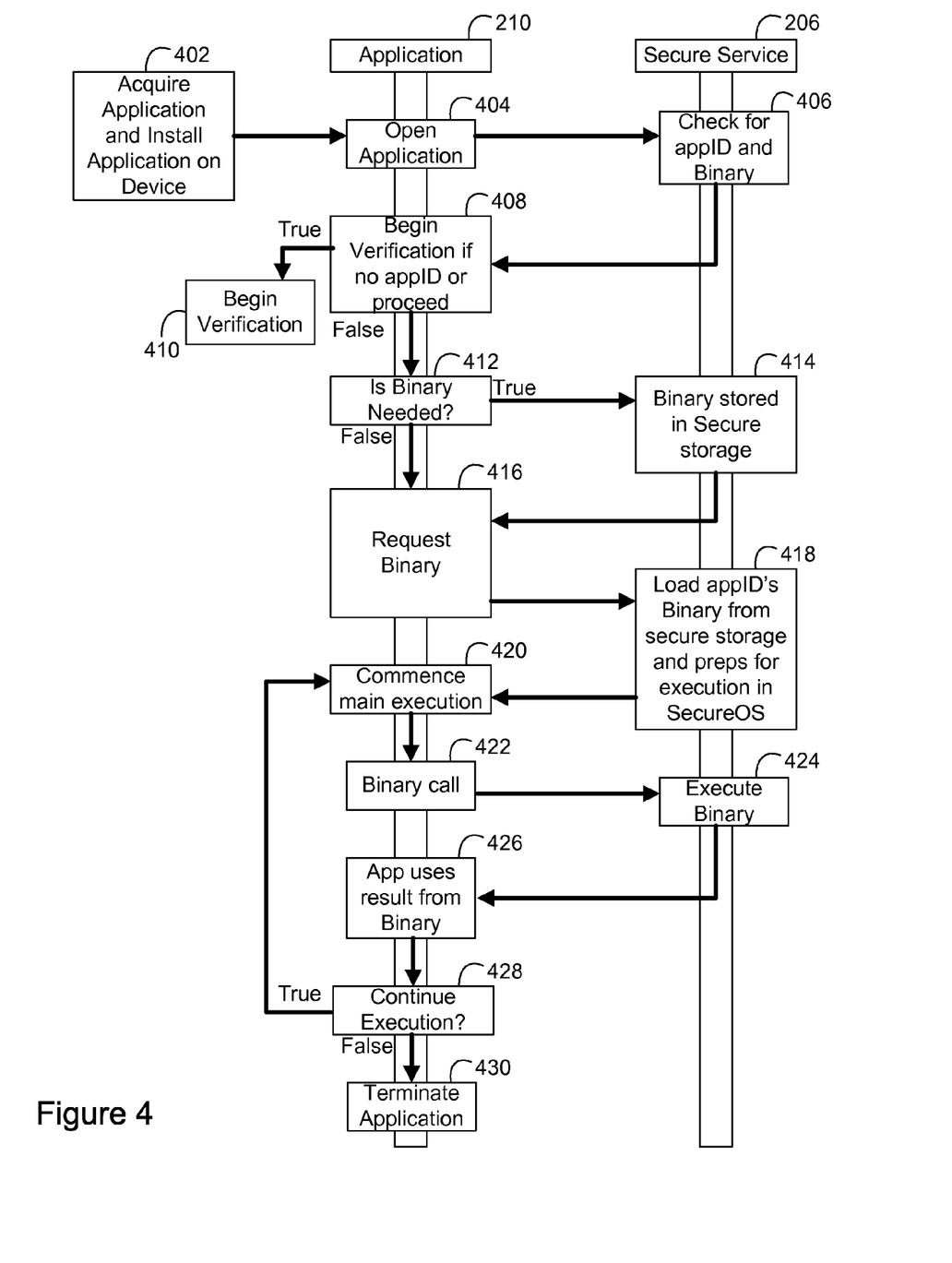
FIG. 4 illustrates an exemplary flow diagram of a method of managing copy protection of a software application in accordance with an embodiment of the present invention.

FIG. 4 illustrates an exemplary flow diagram of a computer controlled method of managing copy protection of a software application, making use of a Secure Service application 206 in a Secure OS 204. As illustrated in FIG. 4, the steps to the method take place in the Application 210 and the Secure Service 206. In step 402 of FIG. 4, the Application 210 is acquired and installed on a device 100. In one embodiment, if the Application 210 is a purchased application, then a copy protection method as described herein can assume the transaction took place through a service that provides the ability to verify the current software installation has a valid software application license at a later date through a license verification server.

In one embodiment, each individual Application 210 that uses the copy protection described herein on the device 100 stores several key pieces of data used to verify the license or the Binary 218. These can be stored during a final verification step described below in step 524 of FIG. 5. In one exemplary embodiment the Secure Service 206 can be custom code that executes inside a Secure OS 204 on the device 100. In one exemplary embodiment, non-secure software applications can call the Secure Service 206 using manufacturer-defined API calls ("DRM API calls") which also include API calls for communicating with DRM online servers 208.

In one embodiment, for each supported application, the DRM Online Servers 208 can store application-specific data including: a unique application identification number ("appID"), a software application's binary decryption key ("appBinaryDecryptionKey") which the Secure Service 206 can use to decrypt the Application's Binary 218, and the software application Binary's cryptographic signature ("appSignature"). For each device 100, the DRM online servers 208 can store device-specific data. Such data can be used by the DRM online servers 208 to securely communicate with and verify the devices 100. Such data can include a unique device identification number ("deviceID") and device encryption keys used for various parts of the verification phase. In one exemplary embodiment, a manufacturer's chip identification number fused into the chip during manufacturing can be used. In one exemplary embodiment, the International Mobile Equipment Identity ("IMEI") for wireless devices could be used. In a further exemplary embodiment, a unique ID can be generated.

As discussed below, in one exemplary embodiment, the encryption of the encrypted Binary 212 will be unique per device 100. While a same type of encryption can be used for the encrypted Binary 212, the key the device 100 receives to decrypt the encrypted Binary 212 can be unique to a particular device 100/Application 210 combination. In one exemplary embodiment, there can be a global key for each software application. Furthermore, the global key to decrypt the encrypted portion 212 can be encrypted itself with a key unique to each device 100/application 210 combination.

In step 404 of FIG. 4, the Application 210 is opened. In one exemplary embodiment, the Application 210 is launched and during initialization the Application 210 issues an "open app" DRM API call containing its appID. In step 406 of FIG. 4, during the open app function execution, the Secure Service 206 checks if the appID is in the secure storage 108. If the requested appID is not in the secure storage 108, the Secure Service 206 returns "recheck" to the Application 210. If there is a stored appID in the secure storage 108, the Secure Service 206 then checks if there is a decrypted Binary 220 for that Application 210 in the secure storage 108. If there is not a Binary 218 for the Application 210, the Secure Service 206 returns "send binary" to the Application 210, otherwise the Secure Service 206 returns "OK" to the Application 210.

As discussed above, the "Binary" is a parcel of encrypted code created during development by a software application's developer using a compiler tool provided by the developer of the Secure Service 206. The tool can compile a code parcel and encrypts it with an application encryption key ("appKey"). The developer then includes the Binary with the application (as illustrated in FIG. 2, the included Binary is the encrypted Binary 212). In one embodiment, the encrypted Binary 212 can only be decrypted 214 by the Secure Service 206 inside the Secure OS 204 using the correct appKey. As illustrated in FIG. 2, the secure storage 108 can hold one or more decrypted Binaries 220 for one or more applications, a decrypted Binary 220 for each application 210. As discussed herein, in one embodiment the encrypted Binary 212 can be found in the Application 210, in another embodiment, the encrypted Binary 212 is not retained in the Application 210 and must be downloaded by the Application 210 from the Application Server 224 during the Verification Phase or thereafter as needed, and is passed by the Application 210 to the Secure Service 206.

Figure 5:
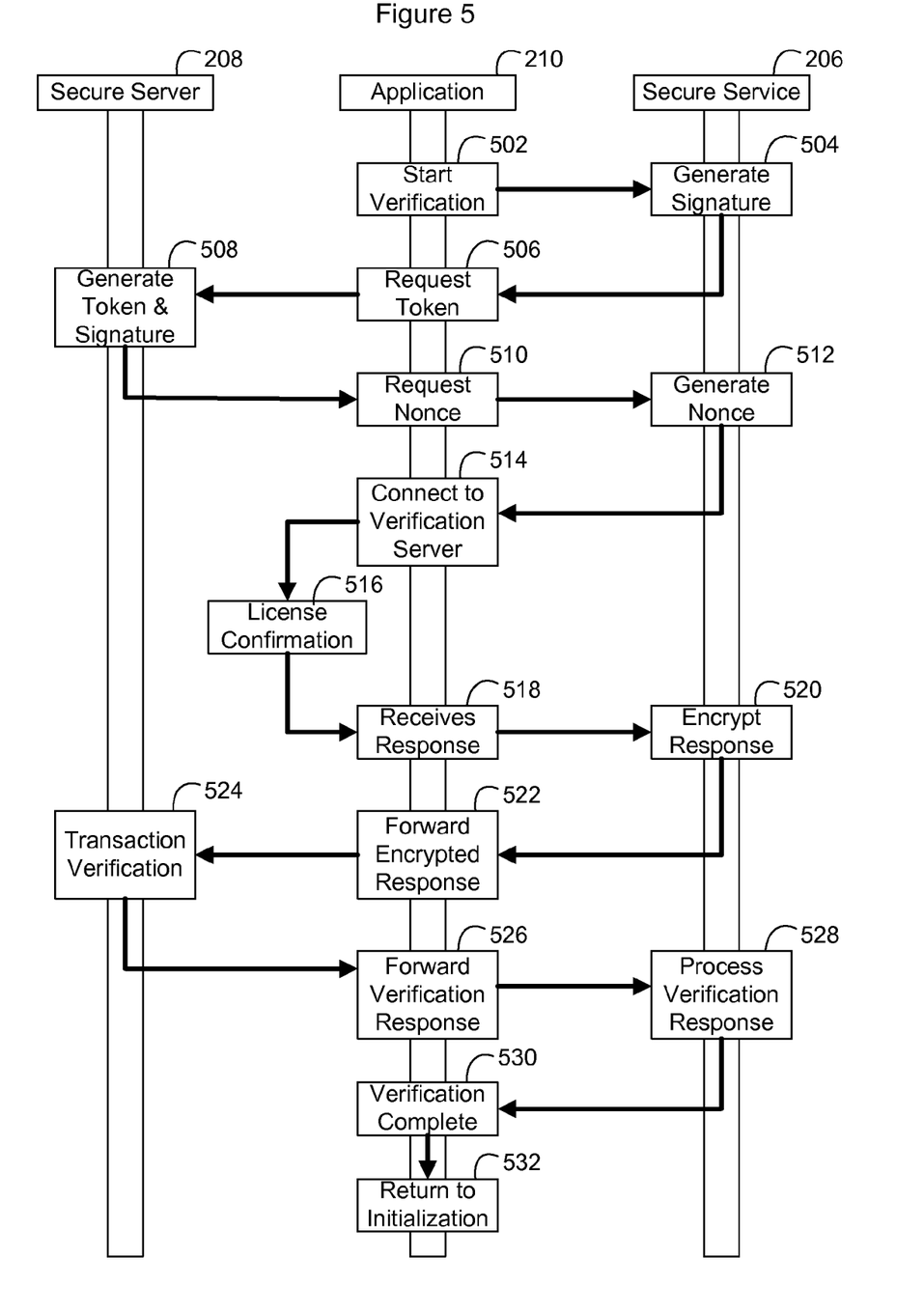
FIG. 5 illustrates an exemplary flow diagram of a method of validating an application for copy protection in accordance with an embodiment of the present invention.

In step 408 of FIG. 4, if the open app function has returned "recheck," the Application 210 begins a Verification Phase in step 502 of FIG. 5, otherwise, processing continues to step 410. In step 410 of FIG. 4, if the open app function has returned "send binary" then the Application 210 issues an "input Binary" DRM API call containing its appID and the encrypted Binary 212. In one embodiment, the encrypted Binary 212 can be loaded from device storage 110, or another location decided by the software application developer. In one exemplary embodiment, the encrypted Binary 212 can be downloaded from the Application Server 224 and passed to the Secure Service 206. Otherwise, the method steps continue to step 416.

In step 414 of FIG. 4, in the input Binary function, the Secure Service 206 decrypts the encrypted Binary 212 with the appBinaryDecryptionKey (downloaded from the DRM servers 208 during the Verification Phase) and verifies the decrypted Binary's 220 signature with the appSignature (also downloaded from the DRM servers 208 during the Verification Phase). If the Binary 218 is verified, the decrypted Binary 220 can be stored in the Secure Storage 108, otherwise, garbage data, as determined by the Application developer can be stored in Secure Storage 108 for that appID.

In step 416 of FIG. 4, the Application 210 calls the "open Binary" DRM API with its appID to load the decrypted Binary 220 into the Secure RAM 106. In step 418 of FIG. 4, the Secure Service 206 loads the decrypted Binary 220 for the corresponding appID from secure storage 108 and with the Interpreter 218 prepares the decrypted Binary 220 for execution inside the Secure OS 206. In one exemplary embodiment, the decrypted Binary 220 is initialized as needed. As illustrated in FIG. 2, once initialized and/or interpreted by the Interpreter 216, the decrypted Binary 220 is the Binary 218.

In step 420 of FIG. 4, the execution of the main application execution loop can begin. An exemplary embodiment of an execution of a main application execution loop 300 is also illustrated in FIG. 3. At a predetermined point in the execution loop, the software application will progress to step 422. In step 422 of FIG. 4, the software application will issue the "use Binary" DRM API call containing the appID and a block of data that is to be passed to the Binary 218 inside the Secure Service 206. In one exemplary embodiment, the passed data can be anything a developer chooses, as can the function executed by the Binary 218.

In step 424 of FIG. 4, in response to the use binary call, the Secure Service 206 can execute the appID's Binary 218 with the passed block of data. In one exemplary embodiment, the Binary 218 can execute, processing the input data and storing a result into an output buffer. When the Binary 218 has completed execution, the Secure Service 206 can copy the output buffer back to the Application 210. In step 426 of FIG. 4, the Application 210 receives the data stored in the output buffer from the Secure Service 206 and uses that data as decided by the developer.

In one exemplary embodiment, if the Application 210 has not been verified, so that the encrypted Binary 212 has not been decrypted 214, then a produced result of calling the Binary 218 can be garbage data. If the Application 210 has not been verified in step 414, then rather than a decrypted binary 220, garbage code or data that results in a desired, predictable, inoperative state in the Application 210 is stored in the Secure Storage 108. In one exemplary embodiment, if the Application 210 has not been verified, the result of calling the Binary 218 is incorrect software behavior (as the garbage data is supplied to the continuing execution loop), but without the Application 210 crashing or otherwise failing to run. In one embodiment, the result of calling the Binary 218 when the Application 210 has not been verified is to exit from the application 210.

In step 428 of FIG. 4, the Application 210 checks to see if it should continue back to step 420 or exit based on a user decision or other end conditions chosen by the developer. As illustrated in FIG. 4, if the Application 210 chooses to continue, then the Application 210 progresses back to step 420 and continues with the execution of the loop. Otherwise, the process will continue to step 430 and terminate the Application 210.

FIG. 5 illustrates an exemplary flow diagram of a computer controlled method for verifying/validating an Application 210 for copy protection. The following process is exemplary in nature, and not meant to be restrictive. Other methods for verifying and validating an Application 210 may also be implemented making use of different verification and validation requirements and procedures. As illustrated in FIG. 5, the Verification Phase illustrated in FIG. 5 comprises steps completed in the DRM Secure Server 208, the Application 210, the Secure Service 206 in the Secure OS 204, as well as a plurality of other servers, such as license verification servers, online transaction servers (e.g., application servers 224 and 3rd party servers), and device servers 222. In step 502 of FIG. 5, the Verification Phase begins with the Application 210 issuing a "Generate Signature" DRM API call to the Secure Service 206.

In step 504 of FIG. 5 a signature is generated by the Secure Service 206 that uniquely identifies the application 210 and the device 100. In one exemplary embodiment, to create the signature ("devAppSignature"), the Secure Service 206 combines the appID and the deviceID and then signs the result with an encryption key unique to the device 100 and known only to the device 100 and the DRM server 208. The devAppSignature is then returned to the Application 210. In step 506 of FIG. 5, the Application 210 requests a transaction token ("Token") from the DRM servers 208 by sending the deviceID, appID and the devAppSignature in a "Request Transaction Token" DRM server call.

In step 508 of FIG. 5, the DRM server 208 verifies that the devAppSignature is valid for both the deviceID and the appID. In one exemplary embodiment, the DRM server 208 creates a Token that is unique to the device 100 for this Verification session and digitally signs the Token. As illustrated in FIG. 5, the Token and signature are then sent back to the Application 210. In step 510 of FIG. 5, the Application 210 receives the Token and the signature and passes them in a "Request Nonce" DRM API call to the Secure Service 206.

In step 512 of FIG. 5, a Nonce is generated in the Secure Service 206. In the Request Nonce function, the Secure Service 206 can verify the Token and that the signature came from the DRM server 208. The Secure Service 206 can then create an encrypted, signed, random "number for use once" (a "nonce") which the Secure Service 206 can return to the Application 210 for use with the license verification or purchase transaction server and DRM server 208. In one exemplary embodiment, if the Token is not verified, then a "garbage" nonce can be created.

In step 514 of FIG. 5, the Application 210 can establish a connection to either a license verification server (if checking for a previously purchased license) or a transaction server (if purchasing a license at that time or "unlocking" parts of the application). In one exemplary embodiment, the data that is sent to the server can vary based on the targeted server (verification or transaction). In one exemplary embodiment, the DRM server 208 requires that the data include the Nonce, and the DRM server 208 can return a signature created with an Application Private Key (the "appPrivateKey") (held by the developer and provided to the operator of the DRM server 208) which matches the Application Public Key (the "appPublicKey") stored in the DRM Servers 208, as discussed above. The Application 210 can then send the required data to the desired server for license verification.

In step 516 of FIG. 5, the software application's license can be verified. In one exemplary embodiment, the verification or transaction server will use the data supplied by the Application 210. In one exemplary embodiment, an online license verification server can confirm that the subject installation is associated with a valid license to the software application. In one exemplary embodiment, an online transaction server can complete a purchase requested by the Application 210. In one exemplary embodiment, the server (verification or transaction) signs the response data with the appPrivateKey and returns the signature (the "Transaction Signature") and response data to the Application 210. In one exemplary embodiment, a server, such as the verification or transaction servers can be used to download to the application 210 the encrypted Binary 212 if the encrypted Binary 212 was not supplied with the Application 210 when installed or if missing at a later time.

In step 518 of FIG. 5, the Application 210 receives the response data and/or Transaction Signature from step 516 and requests the Secure Service 206 to encrypt them. In step 520 of FIG. 5, the Secure Service 206, in an encrypt server response function, combines the server response data and the Transaction Signature and encrypts them with an encryption key unique to the device 100 and known to the DRM server 208. This encrypted response and signature is returned to the Application 210.

In step 522 of FIG. 5, the Application 210 receives the now encrypted data and sends it to the DRM servers 208 for a transaction verification. In step 524 of FIG. 5, the DRM Server 208 can confirm that each of the preceding steps was correctly completed. In one exemplary embodiment, the DRM Server 208 decrypts the encrypted data using the device's unique encryption key. The DRM Server 208 then extracts the data: the Transaction Signature, the Token, and the Nonce. Having extracted the data, the DRM Server 208 can now verify each part. The DRM Server 206 therefore verifies the response from the online license verification or transaction server. In one exemplary embodiment, the DRM Server also encrypts the appID, the appBinaryDecryptionKey, and the appSignature, as a data message. The DRM Server 208 can then sign the data message and send the encrypted data message and signature back to the Application 210.

In step 526 of FIG. 5, the software application 210 passes the encrypted data message and the signature to the Secure Service 206. In one exemplary embodiment, the encrypted data message and signature are passed to the Secure Service 206 through the use of an "Input Message and Signature" DRM API call. In step 528 of FIG. 5, in response to the Input Message and Signature call, the Secure Service 206 decrypts the encrypted data message and verifies the signature to ensure it is receiving data only from the DRM Servers 208. The Secure Service 206 then extracts the appBinaryDecryptionKey and AppSignature and stores them against the appID in secure storage 108, ready for use during the above described Execution Phase. In step 530 of FIG. 5, with the Verification phase completed, the processes continues on to step 532 and returns to the initialization phase.

In one exemplary embodiment, each device 100 comes with a master key. The first time a device 100 goes online and is recognized by the DRM server 208, a key ring is generated and encrypted with the device's master key. This encrypted key ring can be sent to the device 100, as well as stored by the DRM server 208. This allows the DRM server 208 and the device 100 to securely communicate with each other.

In one exemplary embodiment, each device 100 is identified with a device ID such that a particular device ID can be used to link a device with a Master Key. Once the key rings are initialized by the DRM secure server 208 and the device 100, the DRM secure server 208 and the device 100 are able to communicate with each other securely.

In one exemplary embodiment, after the encrypted portion has been decrypted and stored in the secure storage 108, the device 100 does not need to go online again. Such an arrangement will allow an Application 210, after completing the Verification Phase and run the first time to avoid having to go online again. However, should the decrypted portion become lost or corrupted, a new encrypted portion 212 can be requested from the Application 210 and decrypted and stored again in the secure storage 108. In another embodiment, the encrypted portion is not stored with the Application 210 in the unsecure storage 110, but must be downloaded from the application server 224. In another embodiment, the encrypted binary 212 can be stored in the DRM server 208 for retrieval as necessary.

In one exemplary embodiment, if the Application 210 does not have the encrypted Binary 212, then the encrypted Binary 212 can be requested from the DRM server 208 or from the Application server 224. In one exemplary embodiment, the Secure Service 206 can only have the decrypted Binary 220, which is stored in the secure storage 108, if the Verification Phase has been completed. In one exemplary embodiment, part of the Application verification can be the transmitting of the Binary that has been encrypted (e.g., the encrypted Binary 212) so that only the combination device/Application key that it also receives at this time will be able to decrypt it.

In one exemplary embodiment, the encrypted Binary 212 is placed into the unsecured storage 110 (or some other local location) by the Application 210 during installation of the Application 210. The encrypted Binary 212 can only be decrypted after the Application 210 has completed the Verification Phase, where a unique key for the specific Application 210/device 100 combination is provided to the Secure Service 206 to decrypt the encrypted Binary 212.

Whether stored locally or found only in a secured server (e.g., the DRM server 208 or the Application Server 224), the encrypted Binary 212 must be decrypted and prepared for execution because the main execution loop of the Application 210 will be calling the Binary periodically. Failing to verify the license of the software application and thereby not completing the Verification Phase will result in a garbage code or data being stored in the place of the decrypted Binary 220. Therefore, calling the Binary will result in the garbage data being returned to the Application 210 which can result in the Application 210 entering an inoperable state as determined by the garbage data. Therefore, failure to complete the license verification phase can result in the Application 210 being unable to run properly or be unusable all together.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A copy protection method comprising:
   executing a software loop of a first software application in a first operating system;
   executing a first call in the software loop to a code portion;
   loading a decrypted code portion of the first software application in a second operating system from a secure storage area if the decrypted code portion is present in the secure storage area, otherwise decrypting an encrypted code portion of the first software application;
   executing the decrypted code portion of the first software application in the second operating system in response to the first call, wherein the code portion is decrypted in response to a successful validation of the first software application, and wherein a failed validation results in an inoperable state in said first software application, wherein the second operating system is a secure operating system comprising an interpreter module operable to interpret the decrypted code portion; and
   producing a binary ready for execution at the first software application in the first operating system in response to the first call in the first software application.

2. The copy protection method of claim 1, wherein the code portion is executed by and the validation is performed by a second software application in the second operating system.

3. The copy protection method of claim 2 further comprising:
   using a key, decrypting the encrypted code portion of the first software application to produce the decrypted code portion.

4. The copy protection method of claim 3, wherein the decrypting comprises:
   copying the encrypted code portion of the first software application from the first operating system to the second operating system;
   downloading a decryption key for decrypting the code portion after the completion of the validation of the first software application, wherein the decryption key is specific to a particular device and first software application combination;
   decrypting the code portion of the first software application with the decryption key in the second operating system with the second software application; and
   storing the decrypted code portion in the secured storage area.

5. The copy protection method of claim 1 wherein the code portion comprises one of a function, a routine, a subroutine, and a procedure.

6. The method of claim 1, wherein the code portion is downloaded from an application server during a validation phase.

7. A computer system comprising:
   a processor,
   a memory for storing instructions, that when executed by the processor performs a copy protection method comprising:
   executing a software loop of a first software application in a first operating system;
   executing a first call in the software loop to a code portion;
   loading a decrypted code portion of the first software application in a second operating system from a secure storage area if the decrypted code portion is present in the secure storage area, otherwise decrypting an encrypted code portion of the first software application;
executing the decrypted code portion of the first software application in the second operating system in response to the first call, wherein the code portion is decrypted in response to a successful validation of the first software application, and wherein a failed validation results in an inoperable state in said first software application, wherein the second operating system is a secure operating system comprising an interpreter module operable to interpret the decrypted code portion; and
producing a binary ready for execution at the first software application in the first operating system in response to the first call in the first software application.

8. The computer system of claim 7, wherein the code portion is executed by and the validation is performed by a second software application in the second operating system.

9. The computer system of claim 7, wherein the decrypting comprises:
copying the encrypted code portion of the first software application from the first operating system to the second operating system;
downloading a decryption key for decrypting the code portion after the completion of the validation of the first software application, wherein the decryption key is specific to a particular device and first software application combination;
decrypting the code portion of the first software application with the decryption key in the second operating system with the second software application; and
storing the decrypted code portion in the secured storage area.

10. The computer system of claim 7, wherein the data portion comprises one of a function, a routine, a subroutine, and a procedure.

11. A computer system comprising:
a processor;
a memory comprising an unsecured portion and a secured portion, wherein the unsecured portion comprises a first operating system running a first software application, wherein the first software application comprises a software loop, and wherein the secured portion comprises a second operating system running a second software application;
a secured storage area storing a code portion; and a memory for storing instructions, that when executed by the processor perform a copy protection method comprising:
executing the software loop of the first software application;
executing a first call in the software loop to the code portion;
loading a decrypted code portion of the first software application in the second operating system from the secure storage area if the decrypted code portion is present in the secure storage area, otherwise decrypting an encrypted code portion of the first software application; and
executing the code portion of the first software application in the second operating system in response to the first call, wherein a result returned in response to the first call produces one of an unusable state in the first software application when the first software application has not been successfully validated and a usable state in the first software application when the first software application has been successfully validated, wherein the second operating system is a secure operating system comprising an interpreter module operable to interpret the decrypted code portion; and
producing a binary ready for execution at the first software application in the first operating system in response to the first call in the first software application.

12. The computer system of claim 11, wherein the first function and the validation are performed by a second software application in the second operating system.

13. The computer system of claim 11 further comprising:
using a key to decrypt the encrypted code portion of the first software application if the decrypted copy of the code portion is not present in the secured storage area.

14. The computer system of claim 13, wherein the decrypting comprises:
copying the encrypted code portion of the first software application from the first operating system to the second operating system;
downloading a decryption key for decrypting the code portion after the completion of the validation of the first software application, wherein the decryption key is specific to a particular device and first software application combination;
decrypting the code portion of the first software application with the decryption key in the second operating system with the second software application; and
storing the decrypted code portion in the secured storage area.

15. The computer system of claim 11, wherein the data portion comprises one of a function, a routine, a subroutine, and a procedure.

16. The computer system of claim 11, wherein the result returned from the first call that causes the unusable state in the first software application comprises one of a predetermined response, a garbage data, and returning no result.

17. The computer system of claim 16, wherein the code portion comprises one of garbage code and garbage data when the first software application has not been successfully validated.

* * * * *

UNITED STATES PATENT AND TRADEMARK OFFICE
CERTIFICATE OF CORRECTION

PATENT NO. : 9,489,541 B2
APPLICATION NO. : 13/458891
DATED : November 8, 2016
INVENTOR(S) : Anthony Michael Tamasi et al.

It is certified that error appears in the above-identified patent and that said Letters Patent is hereby corrected as shown below:

In the Claims

In Claim 1, Lines 15-16, delete "at the first software application in the first operation system" and replace with --by the second software application in the second operating system--.

In Claim 7, Lines 19-20, delete "at the first software application in the first operation system" and replace with --by the second software application in the second operating system--.

In Claim 13, Lines 25-26, delete "at the first software application in the first operation system" and replace with --by the second software application in the second operating system--.

Signed and Sealed this
Fifteenth Day of August, 2017

Joseph Matal
*Performing the Functions and Duties of the
Under Secretary of Commerce for Intellectual Property and
Director of the United States Patent and Trademark Office*